United States Patent [19]

Crissy et al.

[11] 4,022,496
[45] May 10, 1977

[54] FRANGIBLE DIAPHRAGM REFRIGERATION COUPLING

[75] Inventors: Charles F. Crissy; Christopher L. T. Corbin, both of Jackson, Mich.

[73] Assignee: Aeroquip Corporation, Jackson, Mich.

[22] Filed: Mar. 31, 1975

[21] Appl. No.: 563,714

[52] U.S. Cl. .................................. 285/3; 285/287; 285/DIG. 18
[51] Int. Cl.² ........................................ F16L 35/00
[58] Field of Search ...... 285/3, 4, DIG. 7, DIG. 18, 285/287; 137/167, 168

[56] References Cited

UNITED STATES PATENTS

| | | | |
|---|---|---|---|
| 2,330,841 | 10/1943 | Porker | 285/DIG. 18 |
| 3,201,148 | 8/1965 | Shurtleff | 285/3 |
| 3,285,627 | 11/1966 | Kozulla et al. | 285/3 |

FOREIGN PATENTS OR APPLICATIONS

| | | | |
|---|---|---|---|
| 631,224 | 11/1961 | Canada | 285/3 |
| 1,300,635 | 9/1964 | Germany | 285/3 |

Primary Examiner—Dave W. Arola
Attorney, Agent, or Firm—Beaman & Beaman

[57] ABSTRACT

A coupling for closed fluid systems, such as refrigeration systems, wherein components of the refrigeration system may be precharged with refrigerant, and upon interconnection of the couplings communication between the components is established. The couplings include male and female members each having a passage sealed by a frangible diaphragm. The male member includes a tubular extension having an outer end sealed by a diaphragm whose periphery is axially slidably mounted upon the extension and interconnection of the coupling members engages the male member diaphragm with an abutment surface on the female member, preferably the female diaphragm, restraining the male diaphragm from axial displacement as the members are interconnected. The male extension passes through the diaphragms upon both members piercing and folding the ruptured diaphragms upon the exterior surface of the extension completely clearing the passage defined between the coupling members. The end of the extension makes metal-to-metal contact with an annular seal defined on the female member to establish a completed seal after completion of coupling member assembly.

7 Claims, 7 Drawing Figures

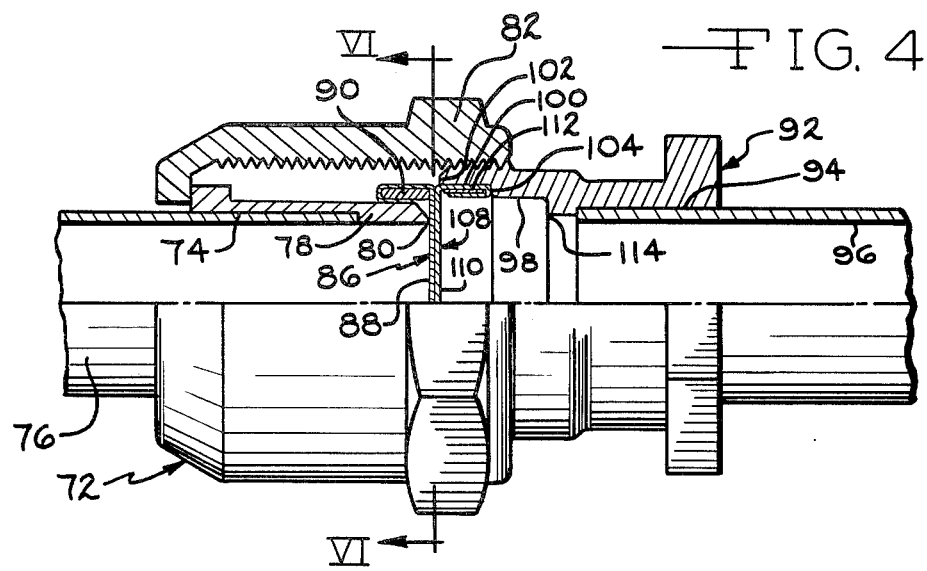
FIG. 4
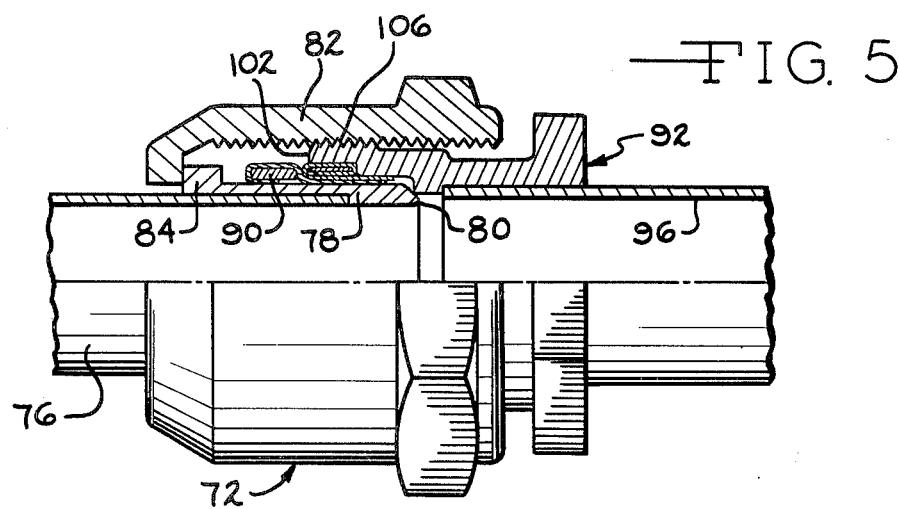
FIG. 5
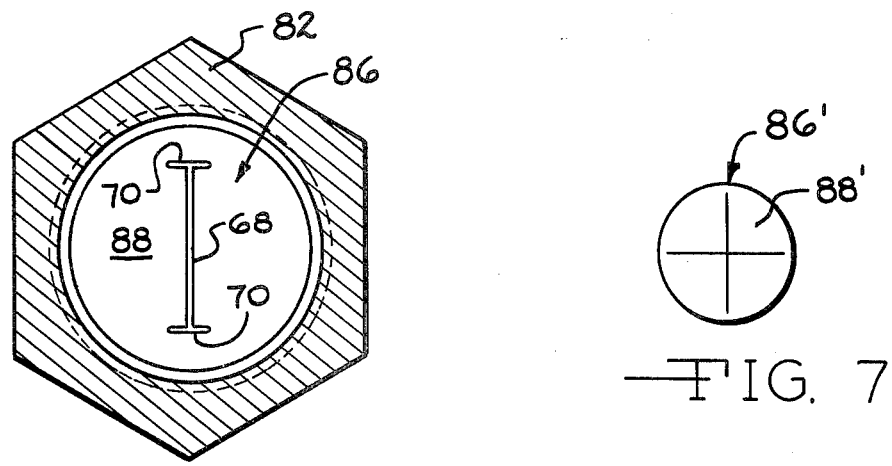
FIG. 6
FIG. 7

FRANGIBLE DIAPHRAGM REFRIGERATION COUPLING

BACKGROUND OF THE INVENTION

The invention pertains to fluid couplings for closed fluid systems utilizing rupturable diaphragms which are automatically ruptured during interconnection of the coupling members.

Refrigeration systems basically consist of evaporator, condenser and compressor units interconnected by a conduit system. In many installations, such as air conditioning systems, it is desired to locate the evaporator, for instance, remotely from the condenser and compressor, and conduits of considerable length may be employed to interconnect these components. As the proper operation of refrigeration systems requires freedom of foreign matter from the systems, including water and water vapor, the components of such systems which are to be installed on site are often precharged with the refrigerant prior to shipment, and provided with sealed couplings to maintain the charge and integrity of the system prior to assembly. The components are provided with couplings which rupture the sealing diaphragms during interconnection of the coupling members, and upon completion of coupling assembly a flow path through the couplings is established, as well as a positive seal between the coupling members.

With sealed couplings of the aforementioned type the efficiency of fluid flow through the coupling is adversely affected by the presence within the coupling of the ruptured diaphragms, or blades or other structure used in the piercing of the diaphragms. U.S. Pat. No. 2,933,333 discloses a sealed coupling of the aforementioned type, and an annular passaged cutting sleeve is used to cut through the diaphragms, and hold the diaphragms, as much as possible, from the flow path. As the diaphragms, in accord with this patent, cannot be completely removed from the flow path a lowering of flow efficiency through the coupling occurs because of the restriction within the passage produced by the ruptured diaphragms. Also, with this type of coupling there is the possibility of ragged diaphragm edges occurring, and small pieces of the ruptured diaphragm may be freed within the conduit system, and create system malfunctioning.

The assignee's U.S. Pat. No. 3,202,442 utilizes a diaphragm rupturing blade or knife in conjunction with an annular blade support whereby the ruptured diaphragms are folded exteriorly and internally about the end of a male member extension. This construction has the advantage of substantially removing the ruptured diaphragms from the coupling flow path, but the cutting blade remains in the flow path creating a turbulence and a reduction of efficiency of flow through the coupling.

Couplings for closed fluid systems in accord with the known prior art are usually of relatively large size due to the internal structure, and at least one of the coupling members usually includes an outer end extending beyond the associated diaphragm whereby a recess is defined capable of accumulating foreign matter, which if not removed prior to coupling member assembly, may enter the refrigeration system, or adversely affect the sealing of the coupling members. Additionally, known seal couplings require significant amounts of metal, and are relatively complex in configuration, requiring relatively high manufacturing costs.

SUMMARY OF THE INVENTION

It is an object of the invention to provide a coupling for a closed fluid system utilizing rupturable diaphragms wherein, upon connection of the coupling members, no restrictions to flow exist within the coupling passage, and the ruptured diaphragms are positively removed from the flow passage in such a manner as to minimize the likelihood of foreign matter entering the passage during coupling member interconnection.

Another object of the invention is to provide a coupling for a closed fluid system utilizing rupturable diaphragms wherein no diaphragm knife or knife holder is required, and the coupling members are free of foreign matter accumulating recesses immediately adjacent the diaphragms.

An additional object of the invention is to provide a coupling for closed fluid systems wherein no air inclusion can occur when the coupling members had initially mated as the respective diaphragms directly engage to exclude air and the diaphragm edges establish a seal during interconnection to prevent leakage. Further, the diaphragms are prestressed during manufacture to control the rupturing and folding of the diaphragm segments during coupling interconnection.

The construction of the coupling in accord with the invention permits easier machining as compared with prior flow-through system couplings, and a material savings as much as 30% for comparable sizes is experienced. Assembly and manufacturing costs are also reduced due to a similarity in sizes between the diaphragm components, and couplings in accord with the invention may be constructed to significantly reduce the overall length of the assembled coupling as compared with known couplings of similar function and capacity.

In accord with the invention the coupling includes male and female members having fluid passages defined therein. Each coupling member includes an outer end which is sealed by a rupturable diaphragm extending across the outer end, and the outer end of the male member constitutes an annular extension capable of telescoping within the female member. The male member diaphragm is mounted upon an annular support ring sealingly mounted on the extension exterior surface for axially slidable movement thereto as the coupling members are interconnected due to engagement of the support ring with an abutment surface defined on the female diaphragm. Thus, during interconnection, the extension outer end is forced through both diaphragms, rupturing the same, and folding the diaphragms upon the extension exterior surface. At the completion of interconnection the ruptured diaphragms have been completely folded on the extension exterior surface out of the coupling flow path and the outer end of the extension engages an annular seat defined in the female member to produce a positive seal between the members, and sealing the ruptured diaphragms from the flow passage.

The fact that the male member diaphragm is axially displaceable mounted on the male member extension permits a complete "withdrawal" of the male diaphragm from the flow path, and the axial movement of the male extension through the female diaphragm, as well as through the male diaphragm, effectively removes the diaphragms from the flow path and in particular, when the diaphragms are prestressed at predetermined locations to control the rupturing thereof, the likelihood of portions of the diaphragm becoming disengaged and falling into the flow path is minimized.

BRIEF DESCRIPTION OF THE DRAWINGS

The aforementioned objects and advantages of the invention will be appreciated from the following description and accompany drawings wherein:

FIG. 4 is an elevational view of an embodiment in accord with the invention, the upper half of the figure being shown in section, wherein the coupling members are axially aligned, and prior to axial displacement therebetween, FIG. 5 is a view similar to FIG. 4 illustrating the relationship of the components upon the completion of interconnection of coupling members, FIG. 6 is an elevational, sectional view of the male diaphragm as taken along section VI—VI of FIG. 4, and FIG. 7 is an elevational view of a diaphragm, per se, in reduced scale illustrating a variation in the prestressed configuration pattern.

DESCRIPTION OF THE PREFERRED EMBODIMENTS

Figure 1:
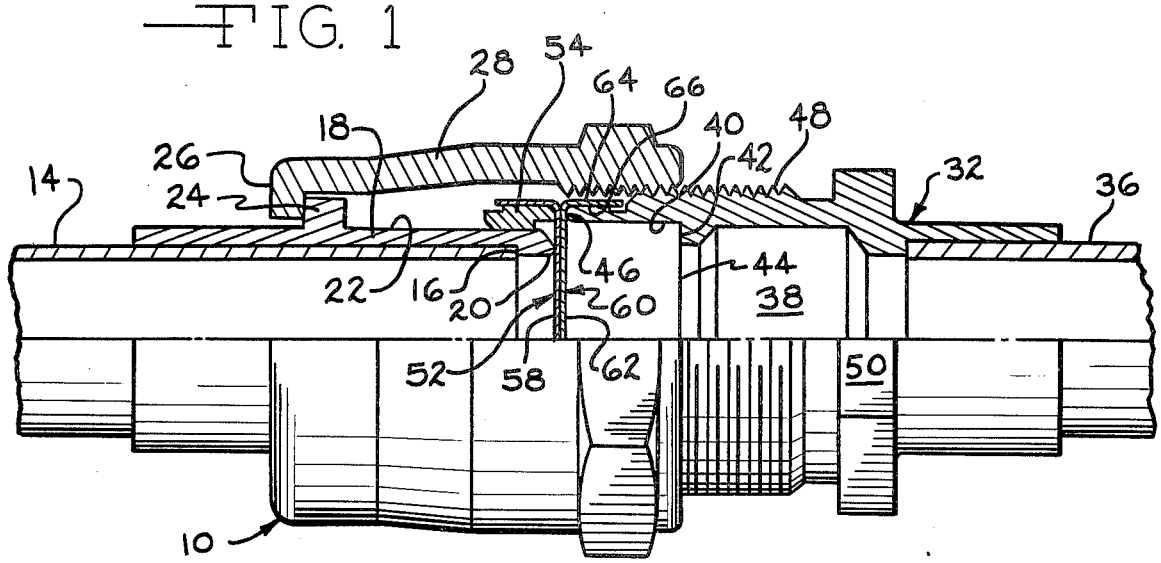
FIG. 1 is an elevational view of a closed fluid system coupling in accord with the invention, the upper half being shown in section, illustrating the relationship of components at initial axial alignment and prior to relative axial displacement.

With reference to FIG. 1, a closed fluid system coupling in accord with the invention includes a male member generally indicated at 10, and a female member generally indicated at 32. The male member is shown as being mounted upon a conduit 14, and being axially positioned with respect to the conduit by engagement of the conduit end with the member shoulder 16. The annular cylindrical extension 18 of the male member includes an outer end 20 which is preferably provided with a chamfered surface. The exterior surface 22 of the extension is cylindrical, and concentric with the axis of the body member. The shoulder 24 defined on the body member cooperates with the flange 26 of an annular nut 28 internally threaded at 30 which forms one half of the attachment means between the coupling members, as will be later apparent. A fluid tight connection between the conduit 14 and the member 10 may be achieved by soldering, or otherwise bonding the conduit within the male member.

The annular female member 32 includes a recess 34 in which the tubular conduit 36 may be soldered or otherwise bonded. A passage 38 is defined in the female member, and includes the cylindrical recessed portion 40 axially defined by shoulder 42 forming the sharp annular seat 44. The member 32 is formed with an outer end 46, and is exteriorly threaded at 48 for cooperation with the threads 30 of the nut 28. As is the usual case, a hexagonal wrench gripping flange is formed on the female member at 50.

The male member 10 is sealed by a thin metal rupturable diaphragm 52 extending across the extension outer end 20, as will be appreciated from FIG. 1. The periphery of the diaphragm 52 is circular, and is affixed to the annular support ring 54 in a sealed manner, such as by soldering, or chemical bonding. The support ring 54 includes a circular outer surface upon which the periphery of the diaphragm is mounted, and also includes an internal cylindrical surface 56 which is pressed upon the extension exterior surface 22. The engagement between the ring surface 56 and the exterior surface 22 is such as to provide a sealed engagement with respect to the refrigerant within the fitting, and will prevent leakage between these surfaces during movement of the extension through the ring 54.

Also, the engagement of the extension nose 20 with the radial flat diaphragm portion 58 also functions to a limited extent as a seal to maintain the fluid within the male member.

The female diaphragm 60 includes a flat radial portion 62 and the annular cylindrical peripheral portion 64. The portion 64 is sealed, either by soldering or mechanical connection, to the surface 66 defined on the female body member as to extend over the outer end 46, sealing the passage 38.

It will therefore be appreciated that the diaphragms 52 and 60 are disposed over the outer ends of the members 10 and 32, respectively, and establish a fluid seal with respect to the passages of the members to maintain the refrigerant therein. Preferably, the radial portions of the diaphragms are centrally prestressed, as by coining or other mechanical process, to weaken a portion of the radial portion and thereby control rupturing of the diaphragm. As shown in FIG. 6, this prestressing may result in an "I" configuration having a diametrically disposed portion 68, and transversely disposed portions 70 of reduced dimension. Further, as shown in FIG. 7, the prestressing may take the form of an "X", as shown in FIG. 7 wherein the location of prestressing is at diametrically crossed lines in diaphragm 86'.

In use, the body members of the coupling are initially oriented as shown in FIG. 1 wherein the passages thereof are axially aligned and the nut 28 is threaded upon the threads 48 to bring the diaphragm portions 58 and 62 into an abutting engagement. Once this abutting engagement is achieved the air between the diaphragms is excluded, which is important with respect to excluding air from the coupling passages during coupling assembly.

It will be noted from FIG. 1 that the support ring 54, and the outer region of the male diaphragm 52 is in axial alignment with the outer end 46 of the female member 32, and the outer region 64 of the female diaphragm 60. This outer peripheral region of the female diaphragm, and outer end 46, constitute an annular abutment which engages the annular outer region of the male diaphragm forming an annular seal therewith, and imposes an axial force upon the support ring as the members are assembled.

As the nut 28 is rotated upon the threads 48 the members 10 and 32 are drawn toward each other, and the extension 18 begins to telescope into the female member passage portion 40. Due to the abutting engagement of the outer regions of the diaphragms the extension 18 moves "through" the support ring 54. This relative movement between the diaphragms and the extension permits the outer end 20 of the extension to exert sufficient axial forces upon the male diaphragm portion 58 to rupture the same, along the prestressed lines thereof, and almost simultaneously the continued axial movement of the extension within the passage portion 40 causes the extension 18 to rupture the female diaphragm portion 62. Continued axial displacement of the extension within the passage portion 40 folds the diaphragm portions 58 and 62 in an annular manner upon the exterior surface 22 of the extension as shown in FIG. 2, and the length of the extension 18, and recess portion 40 is such that upon the extension outer end 20 engaging the annular seat 44 the diaphragm fragments will be completely removed from the flow path of the coupling and located within the recess portion 40 upon the extension exterior surface.

As a sealing connection originally exists between the support ring 54 and the exterior surface 22, the relative movement between the surfaces during interconnection still results in an effective sealing relationship, and this fact, in addition to the fact that the diaphragms are tightly engaged adjacent their peripheries during interconnection, minimizes any loss of fluid from the coupling during interconnection of the members prior to engagement of the extension outer end with the annular seat 44.

Figure 2:
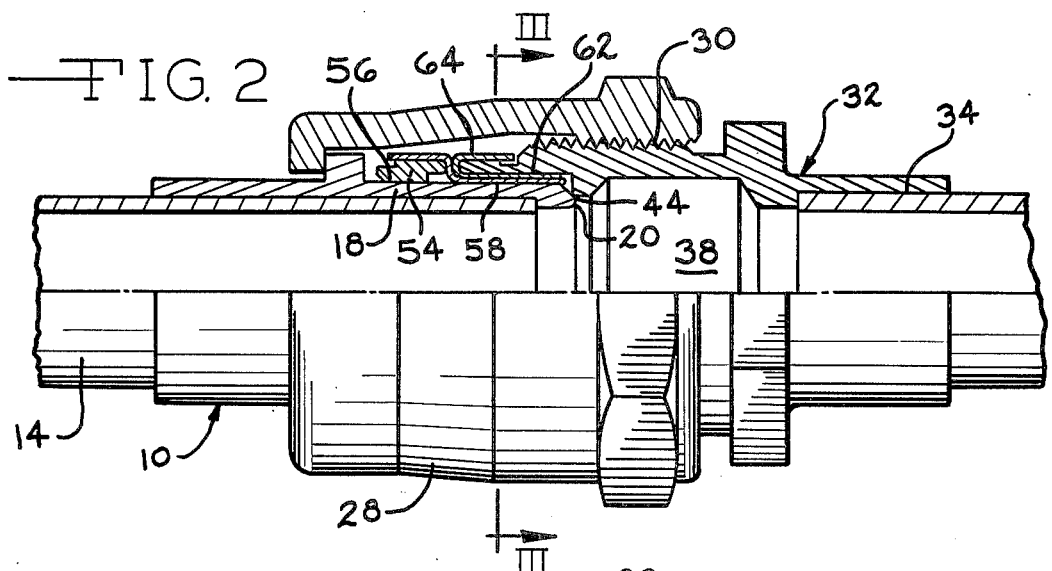
FIG. 2 is a view similar to FIG. 2 illustrating the coupling in its fully assembled relationship.
Figure 3:
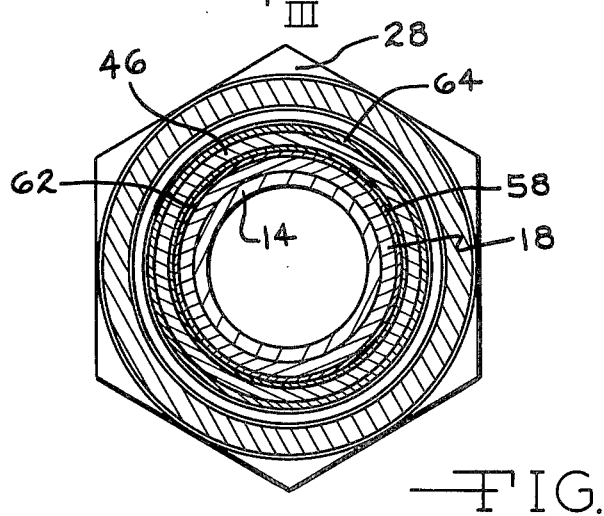
FIG. 3 is an elevational, sectional view taken along section III—III of FIG. 2.

As will be appreciated from FIGS. 2 and 3, the resultant interconnection of the members 10 and 32 provides a completely open flow path between the members, the ruptured diaphragm segments are removed from the flow path, and sealed with respect thereto, and the construction of the members is such that relatively thin radial cross sections may be utilized, with a significant saving in material as compared with other constructions of closed fluid couplings.

The embodiment of FIGS. 4 through 6 is similar in many respects to the previously described embodiment, except that the relationship of components is such that the overall length of the coupling is considerably shorter, for a given diameter conduit, than the embodiment previously described.

With respect to FIG. 4, the male member 72 is of an annular configuration having a recess 74 defined therein for receiving the end of the conduit 76 against the recess shoulder. The extension 78 is provided with the chamfered outer end 80, and includes an exterior surface. The annular nut 82 bears against the flange 84, and the nut is internally threaded throughout most of its axial length. The diaphragm 86 is of a flat configuration at its radial portion 88, and at its periphery is wrapped about an annular support ring 90 circumscribing the extension 78. As it will be appreciated from the drawings, the periphery of the diaphragm is wrapped over the top, end and inner side of the support ring 90 such that the diaphragm itself engages the extension exterior surface. Since the metal material of the diaphragm is relatively soft, as the diaphragm may be formed of a copper or brass alloy, a firm sealed relationship between the diaphragm periphery and the extension surface exists when the ring is pressed onto the extension.

The female member 92 includes a recess 94 for receiving the conduit 96, and the passage includes a recess portion 98 having a diameter greater than the diameter of the extension 78. The recess 98 is further recessed at 100 adjacent the outer end 102, defining a shoulder 104, and the member 92 is exteriorly threaded at 106 for cooperation with the nut threads.

The female diaphragm 108 includes the flat radial portion 110, and at its cylindrical periphery is folded about a ring 112 whereby substantial mechanical strength at the diaphragm periphery is achieved. In this manner the diaphragm periphery may be forced into the recess 100 in an interference fit adjacent shoulder 104, eliminating the need for soldering or other bonding material to establish a sealed relationship between the diaphragm 108 and member 92.

As will be appreciated from FIGS. 4 and 5, when members 72 and 92 are in axial alignment, the peripheries of the diaphragms 86 and 108 are in axial alignment whereby the periphery of the female diaphragm 108 functions as an abutment engaging the peripheral region of the male diaphragm 86 to restrict axial movement of the male diaphragm as the members are axially displaced during interconnection by the nut 82. During such interconnection the peripheries of the diaphragms sealingly engage and the outer end of the extension 78 engages the diaphragm portion 88, rupturing the same, and also rupturing the diaphragm portion 110 as the extension moves "through" the periphery of the diaphragms. As appreciated in FIG. 5, at the completion of the interconnection of the members, the extension 78 is fully received within the recessed portion 98, and engages the annular seat 114 establishing a metal-to-metal seal between the coupling members.

With respect to the embodiment of FIGS. 4 through 6, by locating the periphery of the diaphragm 108 in radial alignment with the threads 106 the overall length of the coupling can be shortened as compared with the embodiment of FIGS. 1 through 3 wherein the periphery of the female diaphragm and the female member threads are axially displaced. Further, the wrapping of the diaphragm peripheries about support rings eliminates soldering or bonding operations.

The seal between the male diaphragm support ring and the male extension during interconnection of the coupling members has, in practice, been effective to prevent leakage. However, if a tighter seal between the support ring and extension is desired during interconnection the extension exterior surface may be slightly conical, convergent toward the extension outer end, to increase the degree of fit between the support ring and extension as the extension moves through the diaphragms.

It will be appreciated that with the practice of the invention the aforementioned objects thereof have been achieved. Full fluid flow, complete elimination of the ruptured diaphragms from the flow path, metal-to-metal final sealing and a reduction of material are all achieved without sacrifice of operating prerequisites. It is appreciated that various modifications to the inventive concept may be apparent to those skilled in the art without departing from the spirit and scope of the invention.

We claim:

1. A coupling for a closed fluid system characterized by an uninterrupted flow path upon the coupling members being fully coupled, comprising, in combination, male and female coupling members each having a passage defined therein, interconnectible threaded nut union means defined on said members for moving said members toward each other in passage aligning relation, each of said members including an annular outer end concentric with the passage of the associated member, male and female frangible diaphragms sealingly mounted upon said male and female members, respectively, extending over said outer ends and sealing the passages of said respective members, said diaphragms being of substantially equal diameter and each including a peripheral region, the peripheral regions of said diaphragms being in axial alignment and engaging each other upon said members being aligned for coupling and initially interconnected, means axially fixing the peripheral region of said female diaphragm upon said female member, an annular extension defined on said male member defining said outer end thereof, and annular periphery means axially slidably mounting said male diaphragm peripheral region on said extension, said diaphragm peripheral regions sealingly engaging during coupling of said members as said extension is axially displaced through said annular peripheral means and the outer end of said extension ruptures said diaphragms and fold the ruptured diaphragms upon said extension.

2. In a coupling for a closed fluid system as in claim 1, an annular seat defined in the passage of said female member, said extension outer end sealingly engaging said seat upon the completion of coupling of said members.

3. In a coupling for a closed fluid system as in claim 1, said extension having an exterior surface having a circular transverse cross section, said annular periphery means being sealingly slidably mounted upon said exterior surface.

4. A coupling for a closed fluid system characterized by an uninterrupted flow path upon the coupling members being fully coupled, comprising, in combination, male and female coupling members each having a passage defined therein, attachment means for moving said members toward each other in passage aligning relation, an annular passage defining extension defined on said male member having an outer end and an exterior surface having a diameter less than and receivable within said passage within said female member, an annular diaphragm support ring axially slidably and sealingly mounted upon said extension exterior surface, a male frangible diaphragm mounted upon said support ring extending across said male member passage and extension outer end sealing said male member passage prior to interconnection of said members, an outer end defined on said female member, a female frangible diaphragm fixed upon said female member extending across and sealing said female member passage at said female member outer end prior to interconnection of said members, said female diaphragm having a periphery sealed to said female member and of a diameter greater than the diameter of said male member extension, said female diaphragm periphery being in axial alignment with said support ring and constituting abutment means defined on said female member engaging said male diaphragm in axial alignment with said support ring during initial interconnection of said members and maintaining a constant axial relationship between said support ring and female member during interconnection of said members whereby said extension slides through said support ring and enters said female member passage and said extension outer end pierces said male and female diaphragms and said pierced diaphragms are opened and folded upon said extension exterior surface intermediate said surface and said female member passage.

5. In a coupling for closed fluid systems as in claim 4 wherein said female member passage includes an outer end disposed toward said male member during interconnection of said members, said female diaphragm being disposed adjacent said female member passage outer end whereby upon initial interconnection of said members said male and female diaphragms abuttingly engage and exclude air from between said diaphragms in axial alignment with said members' passages.

6. In a coupling for closed fluid systems as in claim 4 wherein said male diaphragm is bonded to said support ring.

7. In a coupling for closed fluid systems as in claim 4 wherein said male diaphragm includes a folded periphery, said diaphragm periphery being folded about said support ring in sealed relationship thereto.

* * * * *